(12) United States Patent
Harris (10) Patent No.: US 10,773,162 B1
(45) Date of Patent: Sep. 15, 2020

(54) SYSTEMS AND METHODS FOR SEPARABLE FOREGROUND AND BACKGROUND RENDERING

(71) Applicant: Electronic Arts Inc., Redwood City, CA (US)

(72) Inventor: Matthew Lawrence Harris, Redwood City, CA (US)

(73) Assignee: Electronic Arts Inc., Redwood City, CA (US)

(*) Notice: Subject to any disclaimer, the term of this patent is extended or adjusted under 35 U.S.C. 154(b) by 0 days.

(21) Appl. No.: 16/231,241

(22) Filed: Dec. 21, 2018

(51) Int. Cl.
| | | |
|---|---|---|
| *H04N 13/00* | (2018.01) | |
| *A63F 13/355* | (2014.01) | |
| *G06T 15/20* | (2011.01) | |
| *G06F 3/14* | (2006.01) | |
| *A63F 13/525* | (2014.01) | |
| *H04L 29/06* | (2006.01) | |

(52) U.S. Cl.
CPC .......... *A63F 13/355* (2014.09); *A63F 13/525* (2014.09); *G06F 3/14* (2013.01); *G06T 15/20* (2013.01); *H04L 65/4069* (2013.01); *H04L 65/601* (2013.01); *H04L 67/38* (2013.01)

(58) Field of Classification Search
CPC .. A63F 13/12; A63F 13/355; A63F 2300/534; A63F 2300/538; A63F 2300/66; G09G 2340/00; G09G 2340/04; G09G 2340/10; G09G 2340/12; G09G 2350/00; G09G 2370/022; G06T 19/003; G06T 3/4092; H04N 13/117; H04N 13/161; H04N 13/275; H04N 13/279; H04N 21/21805; H04N 21/6587; H04N 21/816
See application file for complete search history.

(56) References Cited

U.S. PATENT DOCUMENTS

| | | | |
|---|---|---|---|
| 2018/0220120 A1* | 8/2018 | Watson | ............ H04N 21/23439 |
| 2018/0268517 A1* | 9/2018 | Coban | .................. H04N 19/597 |

\* cited by examiner

*Primary Examiner* — Lawrence S Galka
(74) *Attorney, Agent, or Firm* — McDermott Will & Emery LLP (57) ABSTRACT

Various aspects of the subject technology relate to systems, methods, and machine-readable media for streaming a game. The method includes receiving a background stream rendered on a server and including a server time stamp, the background stream rendered at a first resolution and displayed at a second resolution, the first resolution larger than the second resolution. The method also includes receiving a foreground stream rendered on the server. The method also includes receiving control input from a player at a current time, the control input controlling a camera angle of the game. The method also includes determining a difference in the camera angle intended by the player between the current time and the server time stamp. The method also includes adjusting a display output based on the difference by shifting a focal point of the background stream according to the control input by utilizing extra rendered pixels.

20 Claims, 4 Drawing Sheets

SYSTEMS AND METHODS FOR SEPARABLE FOREGROUND AND BACKGROUND RENDERING

TECHNICAL FIELD

The present disclosure generally relates to streaming a game from a cloud server to a client device, and more particularly to separately rendering foreground and background streams.

BACKGROUND

Conventional techniques for streaming video games includes executing game software on a remote cloud machine and delivering a video of the game to an end user at a client machine. The client machine processes the end user's game control input, and sends the game control input back to the cloud server. The cloud server then processes the game control input, and renders an updated frame that is delivered back to the client machine, where it is displayed to the end user. As a result, the end user does not see their input take effect on their screen until a full round-trip to the cloud server has been made, and the new frame has been rendered. This results in undesirable control latency, which affects the user's enjoyment of playing the game. Additionally, streaming high frame rate video can be expensive in terms of bandwidth and server costs. Therefore, it is desirable to stream a game with low control latency and at a reduced bandwidth.

SUMMARY

The subject disclosure provides for an improved game streaming experience by separately rendering and delivering background and foreground streams from a cloud server to a client device. The background stream is rendered at a higher resolution than what is displayed at the client device. The client device, in turn, is capable of performing image manipulation of the background stream locally in order to appear as though an in-game camera viewpoint has moved. The client device then updates to the next fully rendered frame when it is received from a server. This allows for improved latency and lower bandwidth costs.

According to one embodiment of the present disclosure, a computer-implemented method for streaming a game is provided. The method includes receiving from a server a background stream, the background stream rendered on the server and including background data and a server time stamp, the background stream rendered at a first resolution, the background stream displayed at a second resolution on a display of a local client, the first resolution larger than the second resolution and having extra rendered pixels. The method also includes receiving from the server a foreground stream, the foreground stream rendered on the server and including foreground data, the foreground data including location information of the foreground data in relation to the background data. The method also includes receiving, at the local client, control input from a player at a current time, the control input controlling a camera angle of the game. The method also includes determining a difference in the camera angle intended by the player between the current time and the server time stamp. The method also includes adjusting a display output based on the difference by shifting a focal point of the background stream according to the control input by utilizing the extra rendered pixels.

According to one embodiment of the present disclosure, a system is provided including a processor and a memory comprising instructions stored thereon, which when executed by the processor, cause the processor to perform a method for streaming a game. The method includes receiving from a server a background stream, the background stream rendered on the server and including background data and a server time stamp, the background stream rendered at a first resolution, the background stream displayed at a second resolution on a display of a local client, the first resolution larger than the second resolution and having extra rendered pixels. The method also includes receiving from the server a foreground stream, the foreground stream rendered on the server and including foreground data, the foreground data including location information of the foreground data in relation to the background data. The method also includes receiving, at the local client, control input from a player at a current time, the control input controlling a camera angle of the game. The method also includes determining a difference in the camera angle intended by the player between the current time and the server time stamp. The method also includes adjusting a display output based on the difference by shifting a focal point of the background stream according to the control input by utilizing the extra rendered pixels.

According to one embodiment of the present disclosure, a non-transitory computer-readable storage medium is provided including instructions (e.g., stored sequences of instructions) that, when executed by a processor, cause the processor to perform a method for streaming a game. The method includes receiving from a server a background stream, the background stream rendered on the server and including background data and a server time stamp, the background stream rendered at a first resolution, the background stream displayed at a second resolution on a display of a local client, the first resolution larger than the second resolution and having extra rendered pixels. The method also includes receiving from the server a foreground stream, the foreground stream rendered on the server and including foreground data, the foreground data including location information of the foreground data in relation to the background data. The method also includes receiving, at the local client, control input from a player at a current time, the control input controlling a camera angle of the game. The method also includes determining a difference in the camera angle intended by the player between the current time and the server time stamp. The method also includes adjusting a display output based on the difference by shifting a focal point of the background stream according to the control input by utilizing the extra rendered pixels.

According to one embodiment of the present disclosure, a system is provided that includes means for storing instructions, and means for executing the stored instructions that, when executed by the means, cause the means to perform a method. The method includes receiving from a server a background stream, the background stream rendered on the server and including background data and a server time stamp, the background stream rendered at a first resolution, the background stream displayed at a second resolution on a display of a local client, the first resolution larger than the second resolution and having extra rendered pixels. The method also includes receiving from the server a foreground stream, the foreground stream rendered on the server and including foreground data, the foreground data including location information of the foreground data in relation to the background data. The method also includes receiving, at the local client, control input from a player at a current time, the control input controlling a camera angle of the game. The method also includes determining a difference in the camera angle intended by the player between the current time and the server time stamp. The method also includes adjusting a display output based on the difference by shifting a focal point of the background stream according to the control input by utilizing the extra rendered pixels.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

In the following detailed description, numerous specific details are set forth to provide a full understanding of the present disclosure. It will be apparent, however, to one ordinarily skilled in the art that the embodiments of the present disclosure may be practiced without some of these specific details. In other instances, well-known structures and techniques have not been shown in detail so as not to obscure the disclosure.
General Overview Conventional techniques for streaming a game involve fully rendering each frame of the game on a server. Game software is executed on a remote cloud machine and a video of the game is delivered to an end user at a client machine.

The client machine processes the end user's game control input, and sends the game control input back to the cloud server. The cloud server then processes the game control input, and renders an updated frame that is delivered back to the client machine, where it is displayed to the end user. As a result, the end user does not see their input take effect on their screen until a full round-trip to the cloud server has been made, and the new frame has been rendered. This results in undesirable control latency, which affects the user's enjoyment of playing the game. Additionally, streaming high frame rate video can be expensive in terms of bandwidth and server costs.

In first person shooter games, the aspect of user input for which latency causes the most detriment is camera-look (e.g., where the player uses the right stick or mouse to look around quickly). It would be advantageous to update the camera's orientation on a local client, rather than a remote server, to reduce the latency for this input to provide an improved player experience.

The disclosed system addresses a problem in traditional game streaming tied to computer technology, namely, the technical problem of streaming a video game with low control latency. The disclosed system solves this technical problem by providing a solution also rooted in computer technology, namely, by separately rendering and delivering background and foreground streams to a client device and having the client device perform some image manipulation.

The disclosed subject technology further provides improvements to the functioning of the computer itself because it reduces bandwidth costs and reduces latency. Specifically, a reduction in delivery of fully rendered frames from a cloud server to a client device lowers bandwidth and server costs. Additionally, control latency is reduced by having the client device perform image manipulation locally rather than through a round-trip with the cloud server.

Figure 1:
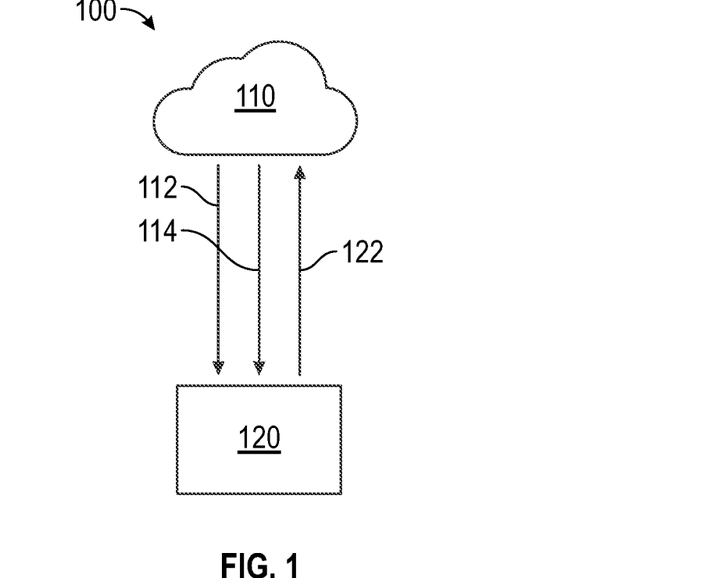
FIG. 1 illustrates an example architecture for streaming a game suitable for practicing some implementations of the disclosure.

As used herein, the term "frame" generally refers to an image of a video sequence. In some systems, such as interleaved displays, the frame may include multiple fields or more complex constructs, but generally a frame represents a view into a computer-generated scene at a particular time or short time window. For example, with 60 frame-per-second video, if one frame represents the scene at t=0, then the next frame would represent the scene at t=1/60 second. In some cases, a frame may represent the scene from t=0 to t=1/60, but in a simple case, the frame is a snapshot in time.
Example System Architecture FIG. 1 illustrates an example system 100 for streaming a game suitable for practicing some implementations of the disclosure. The example system 100 includes a cloud server 110 and a local client 120. For example, the local client 120 may be a gaming console, a computer, or the like.

The cloud server 110 executes game software and delivers a video of the game to the local client 120. According to an aspect of the present disclosure, the cloud server 110 may separately render the video into a background stream 112 and a foreground stream 114. For example, the background stream 112 may include background data for the game, such as animation that occurs in the background of the video (e.g., scenery, landscape, other video game characters, etc.). The foreground stream 114 may include foreground data, such as animation that occurs in the foreground of the video (e.g., player controls, heads-up display, a weapon, user interface, etc.). The foreground stream 114 may further include anything that is not to be scrolled/warped on the local client 120.

When displayed together on the local client 120, the background stream 112 and the foreground stream 114 form a complete video.

According to an aspect, the cloud server 110 may render the background stream 112 at a slightly larger resolution than what is actually displayed for any single frame. For example, the background stream may be rendered at 1280× 2200 pixels, but is displayed at 1080×1920 pixels.

The local client 120 may in turn receive control input 122 from a user input (e.g., a controller, joystick, keyboard, mouse, etc.), which is then sent to the cloud server 110 for processing and rendering a subsequent frame. In order to avoid latency caused by a round-trip with the cloud server 110, the control input 122 may be processed locally to make it appear as though a camera has moved. For example, when the local client 120 receives the background stream 112 and the foreground stream 114, the local client 120 checks a most recent control input, and works out a difference in camera angle that a player intended between a current time and a server time stamp associated the background stream 112. The local client 120 may then scroll/warp/adjust a rendered frame of the background stream 112 utilizing the extra rendered pixels at the edges of the rendered frame, such that it matches where the player was intending to point the camera. To finish the process, the newly adjusted background stream 112 is composited on the local client 120 with the foreground stream 114 to provide a final image, which is displayed to the player. Effectively this would be upscaling the framerate of the streamed video after it has been received by the local client 120. For example, video streamed at 60 Hz would appear to be streamed at 120 Hz. According to further aspects, after displaying the final image, a next fully-rendered frame is displayed on the local client 120 when it is next received from the cloud server 110.

The background stream 112 may include a recently rendered frame and metadata. That metadata may include details such as a server time stamp of when the frame was rendered on the cloud server 110 and a camera direction that that frame was rendered from. This way, the local client 120 may compare the server time stamp with a client-side time stamp, determine the camera direction, and compare it to where the player's input should have moved.

According to an aspect, the foreground stream 114 may be rendered at a separate samples per second (SPS) or separate update hertz from the background stream 112. This would result in a reduction in rendering and bandwidth costs for the cloud server 110. As a result, the foreground stream 114 may be a different resolution or different video encoding than the background stream 112. The foreground stream 114 may also include metadata relating to a size and location on screen of the foreground data. For example, in a first person shooter game, if a target rendering rate is 1080×1920 pixels, the player's gun may only need to take up a quarter of that space. The foreground metadata may include positioning of the gun (e.g., how many pixels to the right, how many pixels down, etc.), such that the gun will be in the correct place when the fully-rendered foreground stream 114 and the background stream 112 are combined. According to an aspect, the local client 120 may combine the foreground stream 114 with the background stream 112 by warping the background stream 112 according to an updated camera direction and maintaining a location on a screen of the foreground stream 114. This way, the foreground stream 114 is continued to be rendered and displayed in combination with the background stream 112 as the background stream 112 is updated by the local client 120 based on the updated camera direction. The foreground stream 114 and the background stream 112 may be combined into a 1080×1920 pixel image.

As described herein, the example system 100 effectively halves the time it would take to process the control input 122 (e.g., effectively compensating for a round-trip to the cloud server 110 and back), therefore allowing for incredibly low latency. This also results in a gaming experience that feels like twice the framerate at which it was rendered. This is because even though the game is rendered at a certain frame rate (e.g., 30 Hz), the control input is polled twice as fast (e.g., 60 Hz).

Benefits of the described example system 100 includes an effective latency lower than a minimum round-trip time, which means that players experience improved responsiveness from their controls, even if they are on a server 100 milliseconds away from them. The example system 100 also allows for a lower framerate of the rendered video that does not affect a camera-look latency. For example, instead of rendering a 60 Hz experience on the cloud server 110, a 30 Hz stream is rendered that is as responsive as a 60 Hz rendering. This would reduce not only the bandwidth utilized, but it also lowers GPU rendering costs, which results in lower server costs. The opposite may also be done, which would be to favor player experience by sending the 60 Hz rendered stream as before, but utilize the example system 100 to make the player experience feel like it is running at 120 Hz, which would be desirable for players with a 120 Hz gaming monitor. This is especially advantageous given that current streaming services do not provide a 120 Hz gaming experience.

Example System for Streaming a Game

Figure 2A:
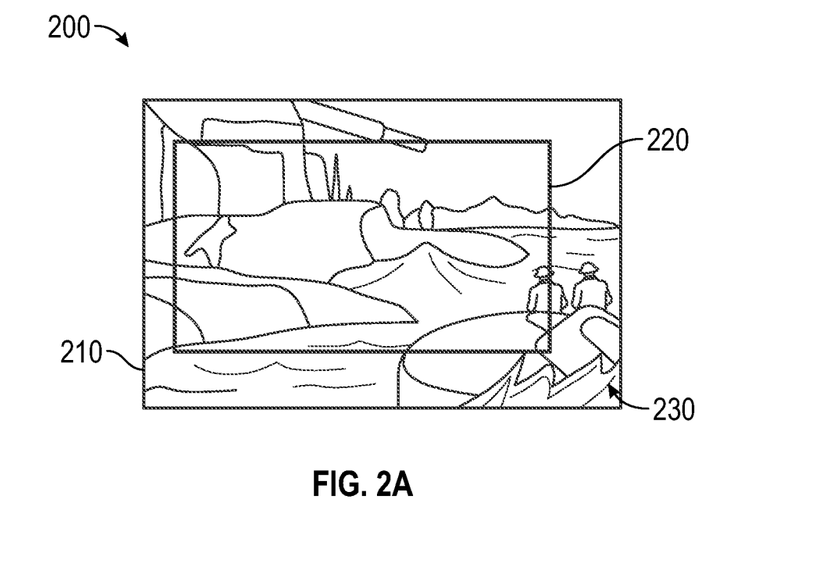
FIGS. 2A-2B illustrate example background and foreground streams, according to certain aspects of the disclosure.

FIG. 2A illustrates an example background stream 200, according to certain aspects of the disclosure. The background stream 200 may include a rendered area 210 (e.g., background stream 112 of FIG. 1) and a display area 220. For example, the rendered area 210 may be larger than the display area 220. The rendered area 210 may also be rendered at a higher resolution than what is displayed. For example, the rendered area 210 may be rendered at 1280× 2200 pixels, and the display area may be 1080×1920 pixels. Extra rendered pixels 230 may be in an area outside of the display area 220 and within the rendered area 210. The extra rendered pixels 230 allow enough space for a client device (e.g., local client 120 of FIG. 1) to shift a view point.

According to an aspect, a server (e.g., cloud server 110 of FIG. 1) may separate background data from foreground data. For example, the background stream may include terrain assets, positions of enemy soldiers, trees, landscape, etc. In an implementation, The server may consider everything past a certain distance that is not directly attached to a playable character as background data to be rendered as the background stream.

Figure 2B:
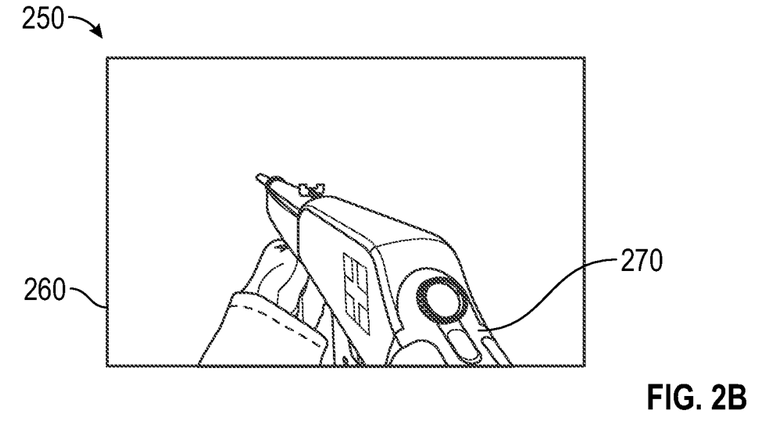

FIG. 2B illustrates an example foreground stream 250, according to certain aspects of the disclosure. The foreground stream 250 may include a foreground area 260 that includes foreground data 270. For example, the server may flag as the foreground data 270 anything that is directly attached to the camera, including a gun, character models, user interfaces, etc. The foreground stream 250 is rendered separately from the background stream 200. In this way, the foreground stream 250 and the background stream 200 are sent separately to the client device.

According to an aspect, the foreground stream 250 may be rendered locally at the client device. In an implentation, the foreground stream 250 may be rendered at a different framerate than the background stream 200. For example, the foreground stream 250 may be rendered at 10 Hz and the background stream 200 may be rendered at 30 Hz.

Figure 3:
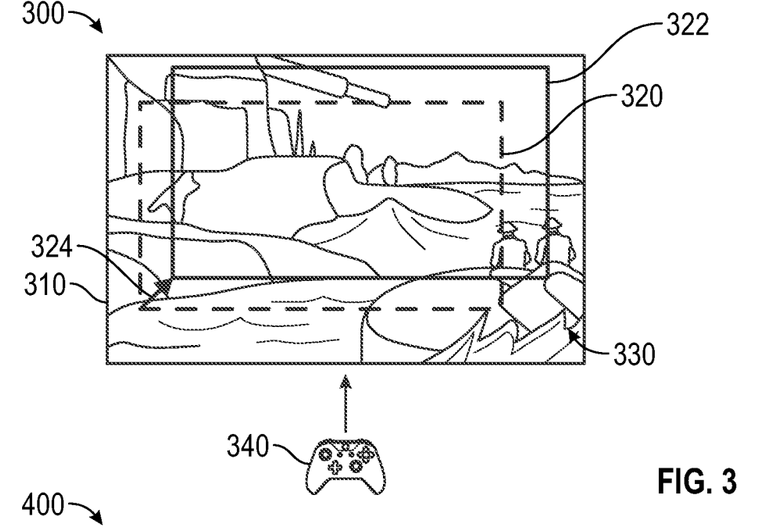
FIG. 3 illustrates shifting of a focal point of a background stream based on controller input, according to certain aspects of the disclosure.

FIG. 3 illustrates an example system 300 for streaming a game from a server to a client. The example system 300 may include a background stream 310 larger than a display area. In an implementation, the background stream 310 may be rendered at 1280×2200 pixels and displayed at 1080×1920 pixels. For example, the first display area 320 and the second display area 322 may each be 1080×1920 pixels. In an implementation the display area may be a cropped version of the background stream 310. The display area may include a first display area 320 and a second display area 322. The second display area 322 may be shifted from the first display area 320. For example, a user may utilize a controller 340 to control a camera, which shifts a view (e.g., a focal point) of the background stream 310 from the first display area 320 to the second display area 322.

The background stream 310 may include a time stamp (e.g., a server time stamp), which indicates a time of when the background stream 310 was rendered. The client may compare its own internal clock (e.g., a current time) to that of the time stamp and determine whether the camera view has shifted, based on user control input. For example, the background stream 310 may have been rendered at the server with a focal point of 10 degrees away from zero. By the time the background stream 310 reaches the client, 15 milliseconds may have passed. The client may compare its own internal clock against the time stamp from the server and determine that 15 milliseconds has passed. The client may then poll input from the controller 340 to determine a difference 324 between what was rendered (e.g., first display area 320) and what the user expects to see (e.g., second display area 322). For example, the client device may shift the first display area 320 to the second display area 322 to reflect control input from the controller 340 (e.g., a diagonal shift). As the user continues to play the game, the client will continue to receive updated background streams from the server and update the camera view based on the control input such that to the user it appears as a smooth motion.

According to an aspect, the client device may utilize extra rendered pixels 330 to adjust the view of the user. Because the background stream 310 is larger than the display area, the extra rendered pixels 330 area available to be utilized for shifting of the view without lagging. This is because the extra rendered pixels 330 provide a buffer between what was rendered on the server and what is possible to be displayed locally at the client device. In an implementation, the extra rendered pixels 330 may be determined by a maximum distance that may be shifted per frame in any direction. For example, the maximum distance may be 10 degrees in any direction.

Figure 4:
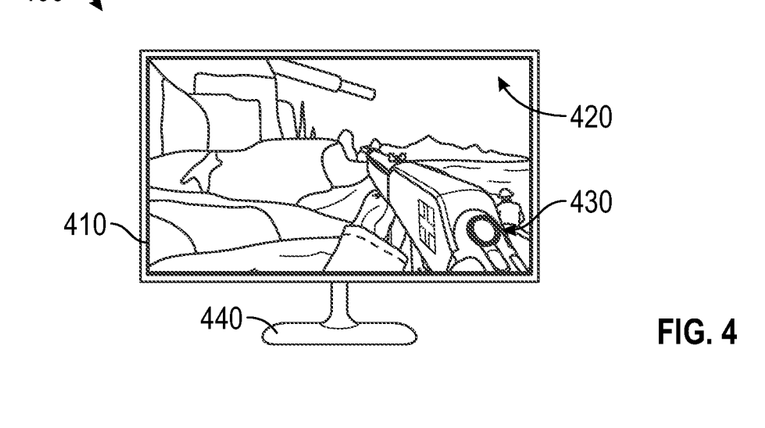
FIG. 4 illustrates an example output display, according to certain aspects of the disclosure.

FIG. 4 illustrates an example display output 400, according to certain aspects of the disclosure. The display output 400 may include a combination of a cropped background stream 410 and a foreground stream 430. The cropped background stream 410 may have been shifted by a client device to an updated camera view, as described above. The cropped background stream 410 may include background data 420. The display output 400 may be displayed on a display 440 (e.g., a monitor, TV, etc.) of the local client. According to an aspect, the display output 400 may be upscaled based on user settings. For example, if the display 440 is set at 4K and the display output 400 is rendered at 1080p, the display output 400 may be scaled up to allow for a buffer area around edges of the rendered image.

The techniques described herein may be implemented as method(s) that are performed by physical computing device(s); as one or more non-transitory computer-readable storage media storing instructions which, when executed by computing device(s), cause performance of the method(s); or, as physical computing device(s) that are specially configured with a combination of hardware and software that causes performance of the method(s).

Figure 5:
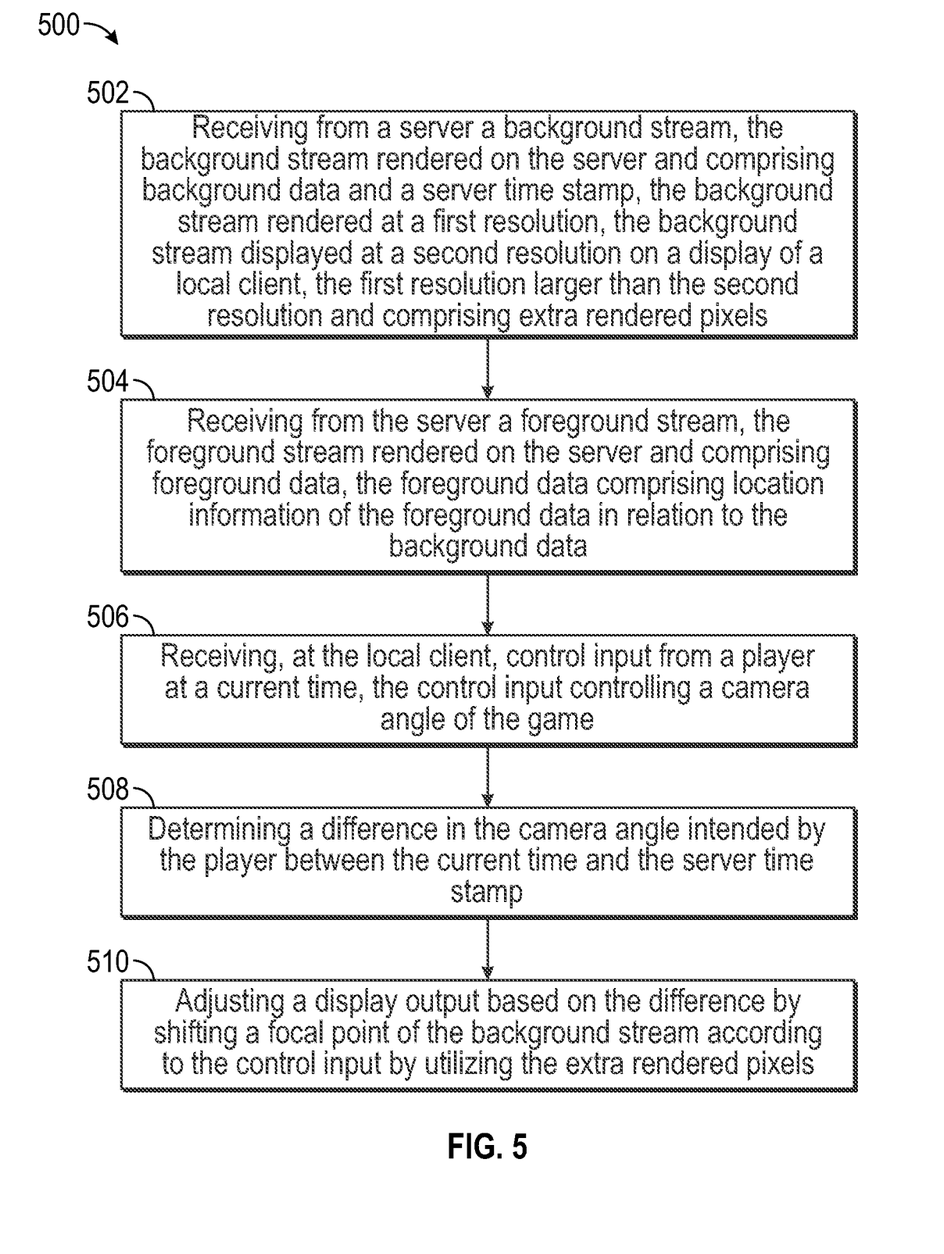
FIG. 5 illustrates an example flow diagram for streaming a game, according to certain aspects of the disclosure.

FIG. 5 illustrates an example flow diagram (e.g., process 500) for streaming a game, according to certain aspects of the disclosure. For explanatory purposes, the example process 500 is described herein with reference to FIGS. 1-4. Further for explanatory purposes, the blocks of the example process 500 are described herein as occurring in serial, or linearly. However, multiple blocks of the example process 500 may occur in parallel. In addition, the blocks of the example process 500 need not be performed in the order shown and/or one or more of the blocks of the example process 500 need not be performed. For purposes of explanation of the subject technology, the process 500 will be discussed in reference to FIGS. 1-4.

At step 502, a background stream is received from a server. The background stream may be rendered on the server and may include background data and a server time stamp. The background stream may be rendered at a first resolution and displayed at a second resolution on a display of a local client. The first resolution may be larger than the second resolution and may include extra rendered pixels.

At step 504, a foreground stream is received from the server. The foreground stream may be rendered on the server and may include foreground data including location information of the foreground data in relation to the background data.

At step 506, control input from a player at a current time is received at a local client. The control input may control a camera angle of the game. At step 508, a difference in the camera angle intended by the player between the current time and the server time stamp is determined. At step 510, a display output is adjusted based on the difference by shifting a focal point of the background stream according to the control input by utilizing the extra rendered pixels.

For example, as described in FIGS. 1, 2A, 3, and 4, in step 502, the cloud server 110 renders a background stream 112, 210, 310, 410 and delivers it to a client device 120. The background stream 112, 210, 310, 410 may be rendered at a larger resolution than what is displayed at the client device 120. In step 504, the cloud server 110 separately renders a foreground stream 114, 250 and delivers it to the client device 120, as described in FIGS. 1 and 2B. In step 506, the client device 120 polls control input from a controller 340 to determine whether a camera angle relating to the background stream 112, 210, 310, 410 should be updated, as described in FIGS. 1, 2A, 3, and 4. In step 508, the client device 120 compares metadata associated with the background stream 112, 210, 310, 410, such as a server time stamp, to determine a difference 324 in the camera angle that should be displayed on a display 440, as described in FIGS. 1, 2A, 3, and 4. In step 510, a focal point of the background stream 112, 210, 310, 410 is adjusted by the client device 120 to a shifted display area 322 based on the determined difference 324 in camera angle by utilizing extra rendered pixels 230, 330 outside of a display area 220, 320, as described in FIGS. 1, 2A, 3, and 4. A display output 322, 400 which includes the background stream 112, 210, 310, 410 combined with the foreground stream 114, 250, is output to the display 440. The display output 322, 400 reflects the latest player control input from the controller 340, as described in FIGS. 1-4.

According to an aspect, the process 500 further includes displaying the display output on the display of the local client, the display output including the background stream and the foreground stream. According to an aspect, the process 500 further includes detecting that the control input has been input by the player. According to an aspect, the process 500 further includes compositing the background stream with the foreground stream to achieve the display output. For example, a location of the foreground stream in relation to the background stream (e.g., at the lower right quadrant of the screen) may be consistent while the camera angle of the background stream is constantly updated based on user controls. The foreground stream may also be updated based on user controls.

According to an aspect, the process 500 includes rendering the background stream and the foreground stream concurrently. According to an aspect, the process 500 includes rendering the background stream at a first interval, and rendering the foreground stream at a second interval. For example, the first interval may be less than or equal to the second interval. In an implementation, the first interval and the second interval are updated at separate intervals. According to an aspect, the local client displays a cropped version of the background stream.

Hardware Overview

Figure 6:
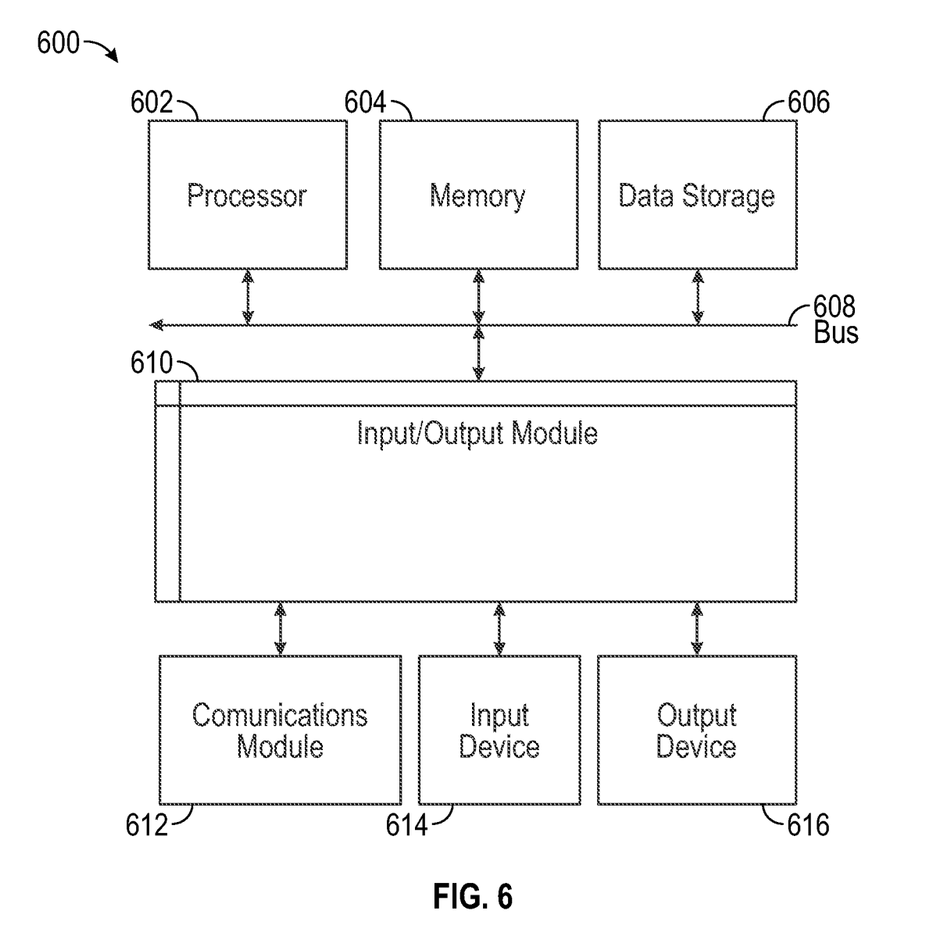
FIG. 6 is a block diagram illustrating an example computer system with which aspects of the subject technology can be implemented.

FIG. 6 is a block diagram illustrating an exemplary computer system 600 with which aspects of the subject technology can be implemented. In certain aspects, the computer system 600 may be implemented using hardware or a combination of software and hardware, either in a dedicated server, integrated into another entity, or distributed across multiple entities.

Computer system 600 (e.g., system 100, system 300) includes a bus 608 or other communication mechanism for communicating information, and a processor 602 coupled with bus 608 for processing information. By way of example, the computer system 600 may be implemented with one or more processors 602. Processor 602 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 600 can include, in addition to hardware, code that creates an execution environment for the computer program in question, e.g., code that constitutes processor firmware, a protocol stack, a database management system, an operating system, or a combination of one or more of them stored in an included memory 604, such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 608 for storing information and instructions to be executed by processor 602. The processor 602 and the memory 604 can be supplemented by, or incorporated in, special purpose logic circuitry.

The instructions may be stored in the memory 604 and implemented in one or more computer program products, i.e., one or more modules of computer program instructions encoded on a computer readable medium for execution by, or to control the operation of, the computer system 600, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 604 may also be used for storing temporary variable or other intermediate information during execution of instructions to be executed by processor 602.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 600 further includes a data storage device 606 such as a magnetic disk or optical disk, coupled to bus 608 for storing information and instructions. Computer system 600 may be coupled via input/output module 610 to various devices. The input/output module 610 can be any input/output module. Exemplary input/output modules 610 include data ports such as USB ports. The input/output module 610 is configured to connect to a communications module 612. Exemplary communications modules 612 include networking interface cards, such as Ethernet cards and modems. In certain aspects, the input/output module 610 is configured to connect to a plurality of devices, such as an input device 614 and/or an output device 616. Exemplary input devices 614 include a keyboard and a pointing device, e.g., a mouse or a trackball, by which a user can provide input to the computer system 600. Other kinds of input devices 614 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback, and input from the user can be received in any form, including acoustic, speech, tactile, or brain wave input. Exemplary output devices 616 include display devices such as a LCD (liquid crystal display) monitor, for displaying information to the user.

According to one aspect of the present disclosure, each of the system 100 and/or the system 300 can be implemented using a computer system 600 in response to processor 602 executing one or more sequences of one or more instructions contained in memory 604. Such instructions may be read into memory 604 from another machine-readable medium, such as data storage device 606. Execution of the sequences of instructions contained in the main memory 604 causes processor 602 to perform the process steps described herein. One or more processors in a multi-processing arrangement may also be employed to execute the sequences of instructions contained in memory 604. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., such as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computer system 600 can include clients and servers. A client and server are generally remote from each other and typically interact through a communication network. The relationship of client and server arises by virtue of computer programs running on the respective computers and having a client-server relationship to each other. Computer system 600 can be, for example, and without limitation, a desktop computer, laptop computer, or tablet computer. Computer system 600 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer readable medium" as used herein refers to any medium or media that participates in providing instructions to processor 602 for execution. Such a medium may take many forms, including, but not limited to, non-volatile media, volatile media, and transmission media. Non-volatile media include, for example, optical or magnetic disks, such as data storage device 606. Volatile media include dynamic memory, such as memory 604. Transmission media include coaxial cables, copper wire, and fiber optics, including the wires that comprise bus 608. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

As the user computing system 600 reads game data and provides a game, information may be read from the game data and stored in a memory device, such as the memory 604. Additionally, data from the memory 604 servers accessed via a network the bus 608, or the data storage 606 may be read and loaded into the memory 604. Although data is described as being found in the memory 604, it will be understood that data does not have to be stored in the memory 604 and may be stored in other memory accessible to the processor 602 or distributed among several media, such as the data storage 606.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the terms "include", "have", or the like is used in the description or the claims, such term is intended to be inclusive in a manner similar to the term "comprise" as "comprise" is interpreted when employed as a transitional word in a claim. The word "exemplary" is used herein to mean "serving as an example, instance, or illustration". Any embodiment described herein as "exemplary" is not necessarily to be construed as preferred or advantageous over other embodiments.

A reference to an element in the singular is not intended to mean "one and only one" unless specifically stated, but rather "one or more". All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Other variations are within the scope of the following claims.

What is claimed is:

1. A computer-implemented method for streaming a game, comprising:
   receiving from a server a background stream, the background stream rendered on the server and comprising background data and a server time stamp, the background stream rendered at a first resolution, the background stream displayed at a second resolution on a display of a local client, the first resolution larger than the second resolution and comprising extra rendered pixels such that a rendered area of the background stream is larger than a display area of the background stream, the rendered area rectangular in shape;
   receiving from the server a foreground stream, the foreground stream rendered on the server and comprising foreground data, the foreground data comprising location information of the foreground data in relation to the background data;
   receiving, at the local client, control input from a player at a current time, the control input controlling a camera angle of the game;
   determining a difference in the camera angle intended by the player between the current time and the server time stamp; and
   adjusting a display output based on the difference by shifting a focal point of the background stream according to the control input by utilizing the extra rendered pixels.

2. The computer-implemented method of claim 1, further comprising:
   displaying the display output on the display of the local client, the display output comprising the background stream and the foreground stream.

3. The computer-implemented method of claim 1, further comprising:
   detecting that the control input has been input by the player.

4. The computer-implemented method of claim 1, wherein the background stream and the foreground stream are rendered concurrently.

5. The computer-implemented method of claim 1, wherein the background stream is rendered at a first interval and the foreground stream is rendered at a second interval.

6. The computer-implemented method of claim 1, wherein the local client displays a cropped version of the background stream.

7. The computer-implemented method of claim 1, further comprising:
   compositing the background stream with the foreground stream to achieve the display output.

8. A system for streaming a game, comprising:
   a processor; and
   a memory comprising instructions stored thereon, which when executed by the processor, causes the processor to perform:
      receiving from a server a background stream, the background stream rendered on the server and comprising background data and a server time stamp, the background stream rendered at a first resolution, the background stream displayed at a second resolution on a display of a local client, the first resolution larger than the second resolution and comprising extra rendered pixels such that a rendered area of the background stream is larger than a display area of the background stream, the rendered area rectangular in shape;
      receiving from the server a foreground stream, the foreground stream rendered on the server and comprising foreground data, the foreground data comprising location information of the foreground data in relation to the background data;
      receiving, at the local client, control input from a player at a current time, the control input controlling a camera angle of the game;
      determining a difference in the camera angle intended by the player between the current time and the server time stamp; and
      adjusting a display output based on the difference by shifting a focal point of the background stream according to the control input by utilizing the extra rendered pixels.

9. The system of claim 8, further comprising stored sequences of instructions, which when executed by the processor, cause the processor to perform:
   displaying the display output on the display of the local client, the display output comprising the background stream and the foreground stream.

10. The system of claim 8, further comprising stored sequences of instructions, which when executed by the processor, cause the processor to perform:
    detecting that the control input has been input by the player.

11. The system of claim 8, wherein the background stream and the foreground stream are rendered concurrently.

12. The system of claim 8, wherein the background stream is rendered at a first interval and the foreground stream is rendered at a second interval.

13. The system of claim 8, wherein the local client displays a cropped version of the background stream.

14. The system of claim 8, further comprising stored sequences of instructions, which when executed by the processor, cause the processor to perform:
    compositing the background stream with the foreground stream to achieve the display output.

15. A non-transitory computer-readable storage medium is provided including instructions that, when executed by a processor, cause the processor to perform a method for streaming a game, comprising:
    receiving from a server a background stream, the background stream rendered on the server and comprising background data and a server time stamp, the background stream rendered at a first resolution, the background stream displayed at a second resolution on a display of a local client, the first resolution larger than the second resolution and comprising extra rendered pixels such that a rendered area of the background stream is larger than a display area of the background stream, the rendered area rectangular in shape;

receiving from the server a foreground stream, the foreground stream rendered on the server and comprising foreground data, the foreground data comprising location information of the foreground data in relation to the background data;

receiving, at the local client, control input from a player at a current time, the control input controlling a camera angle of the game;

determining a difference in the camera angle intended by the player between the current time and the server time stamp; and adjusting a display output based on the difference by shifting a focal point of the background stream according to the control input by utilizing the extra rendered pixels.

16. The non-transitory computer-readable storage medium of claim 15, wherein the method further comprises: displaying the display output on the display of the local client, the display output comprising the background stream and the foreground stream.

17. The non-transitory computer-readable storage medium of claim 15, wherein the method further comprises: rendering the background stream and the foreground stream concurrently.

18. The non-transitory computer-readable storage medium of claim 15, wherein the method further comprises: rendering the background stream at a first interval; and rendering the foreground stream at a second interval.

19. The non-transitory computer-readable storage medium of claim 15, wherein the method further comprises: displaying a cropped version of the background stream on the local client.

20. The non-transitory computer-readable storage medium of claim 15, wherein the method further comprises: compositing the background stream with the foreground stream to achieve the display output.

* * * * *